(12) United States Patent
Modenese et al.

(10) Patent No.: US 12,465,950 B2
(45) Date of Patent: Nov. 11, 2025

(54) MOTOR-VIBRATOR ASSEMBLY FOR A VIBRATING MACHINE

(71) Applicant: OLI S.P.A., Medolla (IT)

(72) Inventors: Michele Modenese, Medolla (IT); Raffaello Frati, Medolla (IT); Giacomo Fabbri, Medolla (IT)

(73) Assignee: OLI S.P.A., Medolla (IT)

( * ) Notice: Subject to any disclaimer, the term of this patent is extended or adjusted under 35 U.S.C. 154(b) by 252 days.

(21) Appl. No.: 18/035,830

(22) PCT Filed: Nov. 10, 2021

(86) PCT No.: PCT/IB2021/060407
§ 371 (c)(1),
(2) Date: May 8, 2023

(87) PCT Pub. No.: WO2022/101800
PCT Pub. Date: May 19, 2022

(65) Prior Publication Data
US 2023/0415200 A1 Dec. 28, 2023

(30) Foreign Application Priority Data

Nov. 10, 2020 (IT) .................. 102020000026819
Jun. 11, 2021 (IT) .................. 102021000015338

(51) Int. Cl.
*B07B 1/42* (2006.01)
*H02K 7/06* (2006.01)
(Continued)

(52) U.S. Cl.
CPC .............. *B07B 1/42* (2013.01); *H02K 7/063* (2013.01); *H02K 11/21* (2016.01); *H02K 11/33* (2016.01); *H02K 2211/03* (2013.01)

(58) Field of Classification Search
CPC .......... B07B 1/42; H02K 7/063; H02K 11/21; H02K 11/33; H02K 2211/03; B06B 1/16; B06B 1/166
(Continued)

(56) References Cited

U.S. PATENT DOCUMENTS 6,213,630 B1 * 4/2001 Kossmann ............ B28B 1/0873
366/128
2011/0303252 A1 12/2011 Marioni
(Continued)

FOREIGN PATENT DOCUMENTS

CN 110967056 4/2020
DE 1279988 B * 10/1968
(Continued)

OTHER PUBLICATIONS

DE1279988 (Year: 1968).*
(Continued)

*Primary Examiner* — Ahmed Elnakib
(74) *Attorney, Agent, or Firm* — Leason Ellis LLP (57) ABSTRACT

Motor-vibrator assembly for a vibrating machine having a plurality of motor-vibrators, each having a synchronous motor and at least one eccentric mass divided into two bodies fixed to two respective free ends of the shaft of the motor. The motor-vibrator assembly comprises position sensing means to sense the angular position and the angular velocity of the shafts of the synchronous motors, electronic drive devices to operate the synchronous motors and an electronic control unit, which is configured to control the electronic drive devices based on the angular positions and on the angular velocities sensed, so that the motor-vibrator assembly generates a predetermined vibratory motion.

16 Claims, 6 Drawing Sheets

(51) Int. Cl.
　　　*H02K 11/21*　　　(2016.01)
　　　*H02K 11/33*　　　(2016.01)
(58) Field of Classification Search
　　　USPC .............................................. 310/73, 81, 82
　　　See application file for complete search history.

(56) References Cited

U.S. PATENT DOCUMENTS

2013/0214651 A1* 8/2013 Kreidler ................ H02K 11/33
　　　　　　　　　　　　　　　　　　　　　　310/68 R
2019/0255571 A1* 8/2019 Kirsch ................... B07B 1/284
2019/0344311 A1　 11/2019 Murphy

FOREIGN PATENT DOCUMENTS

RU　　　2572657　　　1/2016
RU　　　2684893　　　4/2019
RU　　　2714537 C1 *　2/2020　.............. B06B 1/16

OTHER PUBLICATIONS

RU2714537 (Year: 2020).*
International Search Report and Written Opinion in corresponding International Patent Application No. PCT/IB2021/060407, mailed Feb. 28, 2022 (15 pages).
International Preliminary Report on Patentability in PCT/IB2021/060407, mailed Jul. 14, 2022 (8 pages).
Russian Search Report in RU Application No. 2023113831/28(029350), mailed Jan. 25, 2024 (2 pages).

* cited by examiner

MOTOR-VIBRATOR ASSEMBLY FOR A VIBRATING MACHINE

CROSS-REFERENCE TO RELATED APPLICATIONS

This patent application is a U.S. National Phase application under 35 U.S.C. § 371 of International Patent Application No. PCT/IB2021/060407, filed on Nov. 10, 2021, which claims priority from Italian patent applications no. 102020000026819, filed on Nov. 10, 2020 and no. 102021000015338, filed on Jun. 11, 2021, all of which are incorporated by reference, as if expressly set forth in their respective entireties herein.

TECHNICAL FIELD

The invention relates to a motor-vibrator assembly for a vibrating machine.

BACKGROUND ART

Different types of vibrating machines are known, whose difference from one another lies in the structure and in the overall shape for the special use or application they are destined to. Some examples of vibrating machines are: a vibrating feeder to feed a material to a material processing station; a vibrating sieve to sieve granular or powder material; a vibrating extractor for silos or hoppers to facilitate the extraction of granular or powder material from silos or hoppers; vibrating pipe transporters; shaking tables to carry out tests of different types or to compact granular or powder materials; a shakeout device to separate sand from casting; and vibrating gravimetric separators to separate materials that are different from one another exploiting their different specific weight.

The aforesaid examples of vibrating machines all share the fact of comprising a fixed base, which is designed to rest on a ground or floor, a body, for example a tray, a sieve, a wall or a support beam, which is mounted on the base by means of elastic means, for example springs or rubber elements, and a motor-vibrator assembly, which typically comprises a plurality of motor-vibrators fixed to the body in order to generate a predetermined vibratory motion and transmit it to the body. Depending on the special use or application, the generated vibratory motion is, for instance, a straight reciprocating motion or a circular motion or an elliptical motion.

Each motor-vibrator comprises an asynchronous electric motor and an eccentric mass, which is fixed on the shaft of the motor. The motor-vibrator assembly very often comprises mechanical joints, for example universal joints, to connect the shafts of the motors to one another so as to allow the motor-vibrators to be synchronized with one another, namely so as to maintain a certain angular deviation (phase displacement) between the centres of mass of the eccentric masses in order to generate the desired vibratory motion.

The installation, protection, set-up and maintenance of the aforesaid mechanical joints are difficult and, hence, economically burdensome.

There is another type of motor-vibrator assembly, which comprises a plurality of vibrating units and one single electric motor to operate the vibrating units through a transmission shaft. Each one of the vibrating units comprises eccentric masses coupled to one another by means of a large number of oil-bath transmission members according to a modular structure and the vibrating units of a same vibrating machine are often coupled to one another through mechanical joints. Despite the presence of a lubricating oil bath, the large number of moving parts, which, in addition, are subjected to the substantial vibrations intentionally generated by the motor-vibrator assembly, leads to a significant mechanical wear of the transmission members, which, hence, frequently need to be replaced and/or subjected to maintenance.

U.S. Pat. No. 6,213,630 B1 discloses an unbalanced vibrator for stone forming machine, in particular for compacting concrete components during their manufacture. The vibrator has a vibrating table, unbalance shafts arranged on the vibrating table, and electronic motors allocated to the unbalance shafts in order to drive them, wherein the electronic motors have a device for controlling and regulating of the rotational speed and/or the relative phase position of the unbalance shafts. The electronic motors are designed as servo-motors and are provided with a device having sine-cosine transmitters, which determine the angular position and rotational speed of the unbalance shafts.

United States Patent Application No. US 2019/0344311 A1 discloses a vibratory drive system, suitable for a material screening apparatus. The vibratory drive system includes rotatable drive shafts each having a centre of mass offset from its rotational axis. A respective drive mechanism is coupled to each drive shaft and is controlled by a controller. The controller adjusts the relative rotational speed of the drive shafts to adjust the relative angular position of the respective centre of mass of the drive shafts.

United States Patent Application No. US 2011/0303252 A1 discloses a method for measuring the moment of inertia of a washing machine drum containing a load. The drum is set in a rotation by means of a permanent magnet synchronous electric motor.

Russian Patent No. RU2572657C1 discloses a method for automatic setting of resonant modes of oscillation of a vibration machine driven by induction motor.

Chinese Patent Application No. CN110967056A discloses a vibration displacement sensor for a displacement measuring instrument, which is used for the measurement of mechanical vibration.

DISCLOSURE OF INVENTION

The object of the invention is to provide a motor-vibrator assembly for a vibrating machine, which does not suffer from the drawbacks discussed above and, at the same time, can be manufactured in a simple and economic fashion.

According to the present invention, there are provided a motor-vibrator assembly, a vibrating machine and a method to control a vibrating machine according to the appended claims.

BRIEF DESCRIPTION OF THE DRAWINGS

The invention will now be described with reference to the accompanying drawings, showing a non-limiting embodiment thereof, wherein.

BEST MODE FOR CARRYING OUT THE INVENTION

Figure 1:
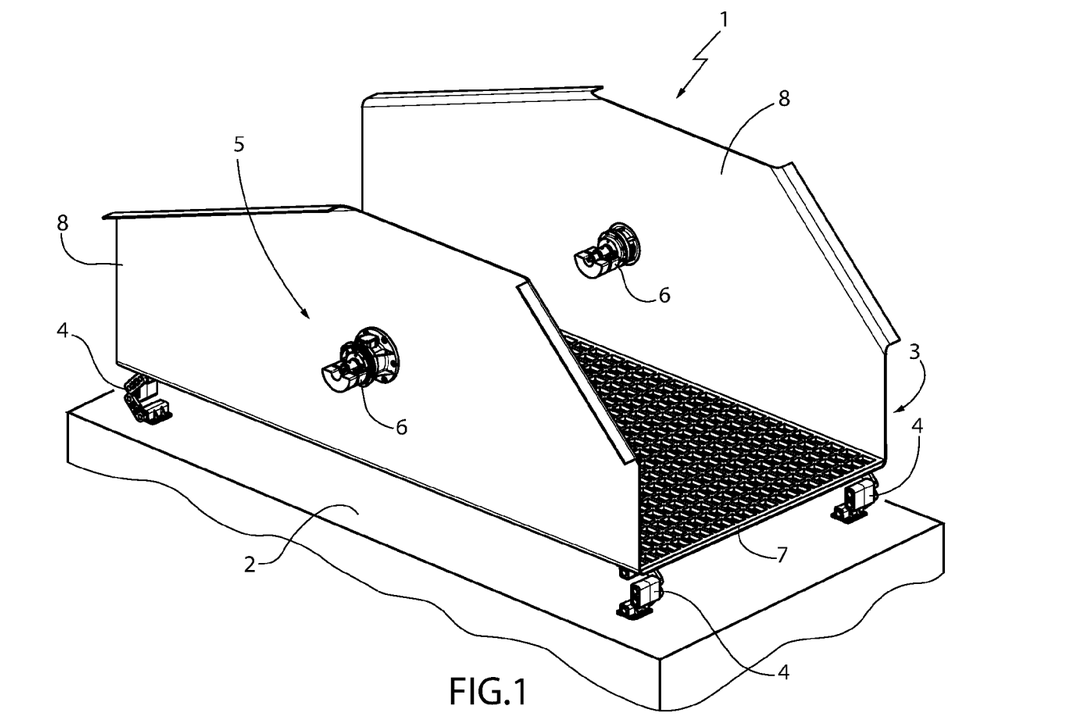
FIG. 1 shows, according to an axonometric view, a vibrating machine comprising a motor-vibrator assembly according to the invention.

In FIG. 1, number 1 generically indicates, as a whole, a vibrating machine resting on a base 2. The vibrating machine 1 comprises a body 3, which can be mounted on the base 2 by means of a plurality of known elastic elements 4, and a motor-vibrator assembly 5, which comprises a plurality of motor-vibrators 6 fixed to the body 3 in order to generate a predetermined vibratory motion and transmit it to the body 3.

In the example shown herein, the vibrating machine 1 is a vibrating feeder, in which the body 3 comprises a grille bottom 7 and two side walls 8 parallel to one another, there are four elastic elements 4 and the motor-vibrator assembly 5 comprises two motor-vibrators 6, each fixed to a respective side wall 8.

According to variants which are not shown herein, the base 2 consists of the ground or the floor, namely the elastic elements 4 have respective ends that can be fixed to the ground or the floor.

Figure 2:
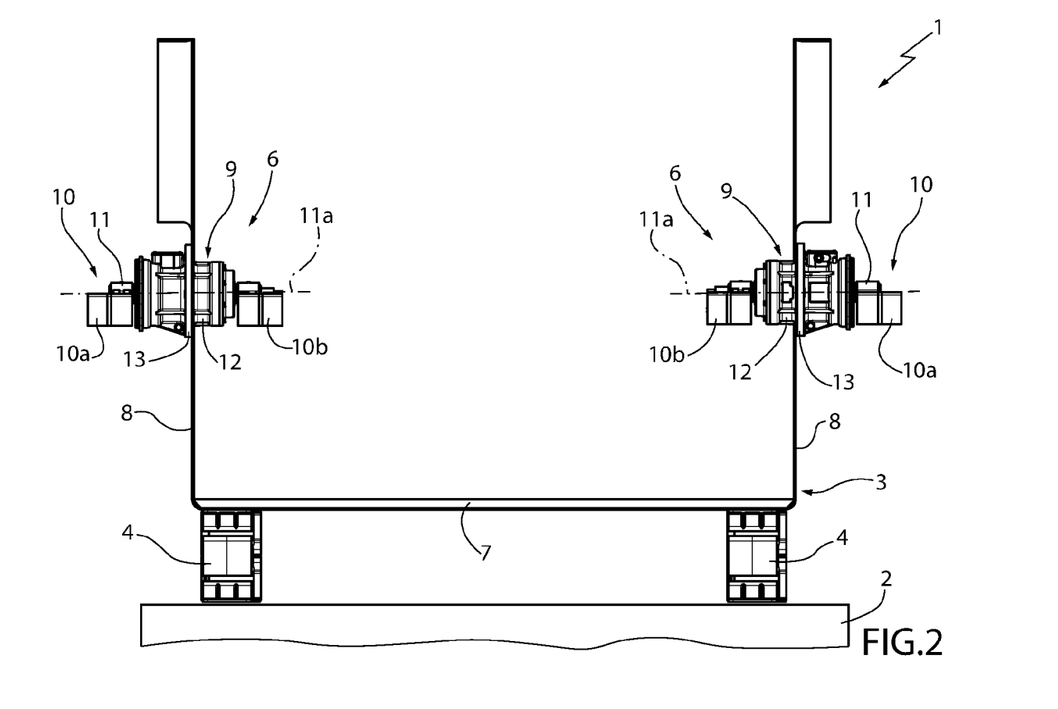
FIG. 2 shows the vibrating machine of FIG. 1 according to a cross section view.

With reference to FIG. 2, each motor-vibrator 6 comprises an electric motor 9 and an eccentric mass 10, which is fixed to the shaft 11 of the motor 9, namely is integral to the shaft 11. The shaft 11 rotates around a respective axis 11a. In the example shown herein, the motor 9 is arranged through a hole (not shown) of the side wall 8, with the axis 11a perpendicular to the side wall 8, and has a casing 12 of its own, which is provided with a flange 13 fixed to the side wall 8. The eccentric mass 10 is divided into two bodies 10a and 10b, which are fixed, namely integral, to the two free ends of the shaft 11. The two free ends of the shaft 11 project from the casing 12 in the area of two respective opposite longitudinal ends of the motor 9. Each one of the two bodies 10a and 10b has a substantially semi-cylindrical shape relative to the axis 11a. The two motor-vibrators 6 are fixed to the respective side walls 8 so as to be coaxial to one another, namely the axes 11a of the respective shafts 11 coincide in one single axis.

Figure 3:
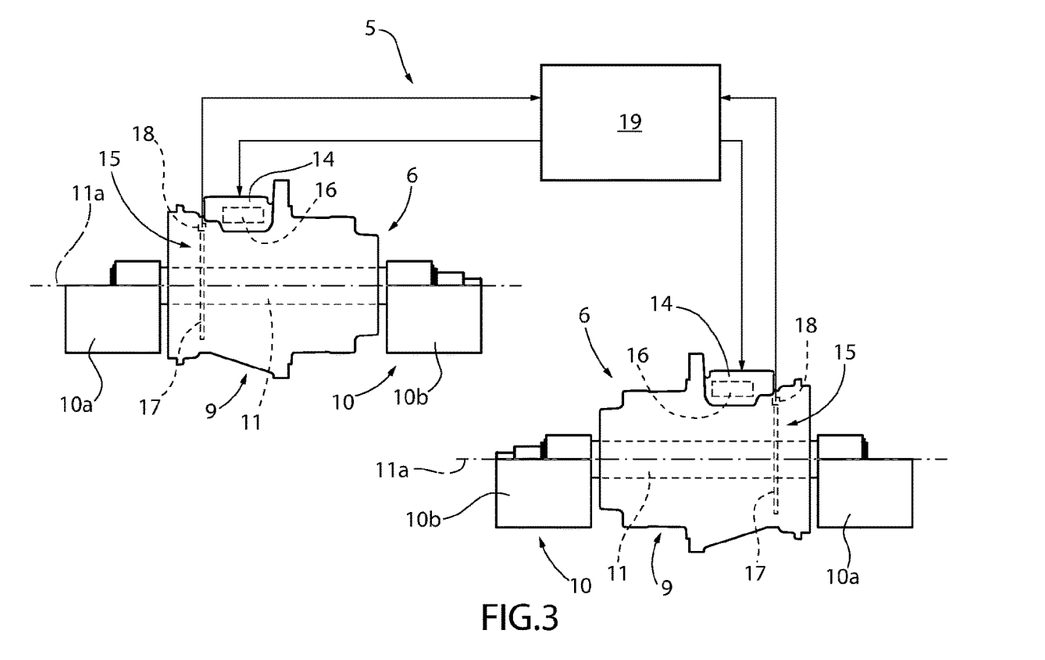
FIG. 3 schematically shows the motor-vibrator assembly of the vibrating machine of FIG. 1.

With reference to FIG. 3, each motor 9 is a synchronous motor, for example a permanent-magnet brushless motor or a reluctance motor, and can be operated by an electronic drive device 14 of its own. Each motor-vibrator 6 comprises respective position sensing means to sense the angular position and measure the angular velocity of the shaft 11. In the example shown in FIG. 3, the position sensing means comprises a position sensor 15 in board the motor 9 of the respective motor-vibrator 6. The electronic drive device 14 is on board the respective motor 9 and, in particular, is integrated in the casing 12. Each electronic drive device 14 comprises an inverter 16, which is designed to operate the respective synchronous motor 9 in a known manner based on commands of an electronic control unit. The position sensor 15 comprises an angular encoder consisting of a phonic wheel 17 integral to the shaft 11 and a sensor element 18 fixed to the casing 12 and facing the phonic wheel 17 in order to read the angular movements thereof in a known manner.

With reference again to FIG. 3, the motor-vibrator assembly 5 comprises an electronic control unit 19, which is configured to control the electronic drive devices 14 of the motors 9 based on the angular positions sensed and on the angular velocities measured by means of the position sensors 15, so that the motor-vibrator assembly 5 generates a predetermined vibratory motion.

According to a further embodiment of the invention which is not shown herein, the electronic drive devices 14 are not integrated on board the respective motors 9. By way of example, the electronic drive devices 14 are located on board the electronic control unit 19.

According to a further embodiment of the invention which is not shown herein, each drive device 14 comprises a pair of inverters 16 to operate a pair of motors 9 of two different motor-vibrators 6.

Figure 4:
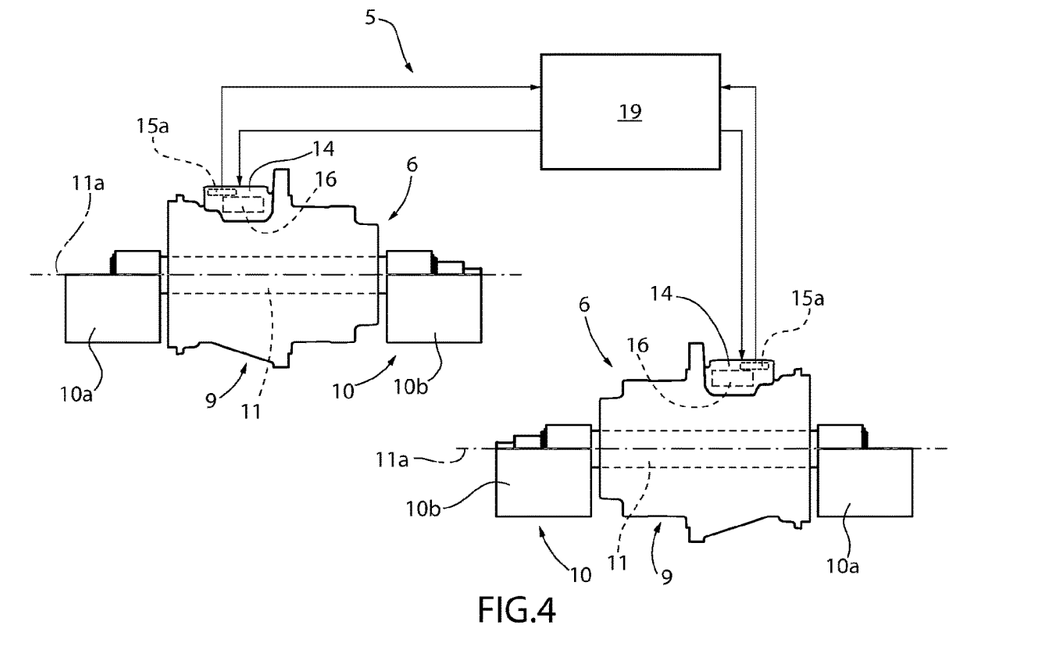
FIG. 4 shows a further embodiment of the motor-vibrator assembly of the vibrating machine of FIG. 1.

According to a further embodiment of the invention shown in FIG. 4, in which the corresponding elements are indicated with the same numbers as in FIG. 3, the position sensing means comprise, instead of the position sensors 15, a plurality of electromagnetic flux observatory means, indicated with 15a in FIG. 4, each integrated in a respective electronic drive device 14 and designed to determine the reciprocal angular position between rotor and stator of the respective motor 9 and, hence, the angular position of the respective shaft 11. In other words, according to the embodiment of FIG. 4, the motor-vibrator assembly 5 comprises electronic drive devices 14 of the sensorless type to sense the position and to measure the angular velocity of the respective motors 9 in the absence of position sensors 15.

Figure 5:
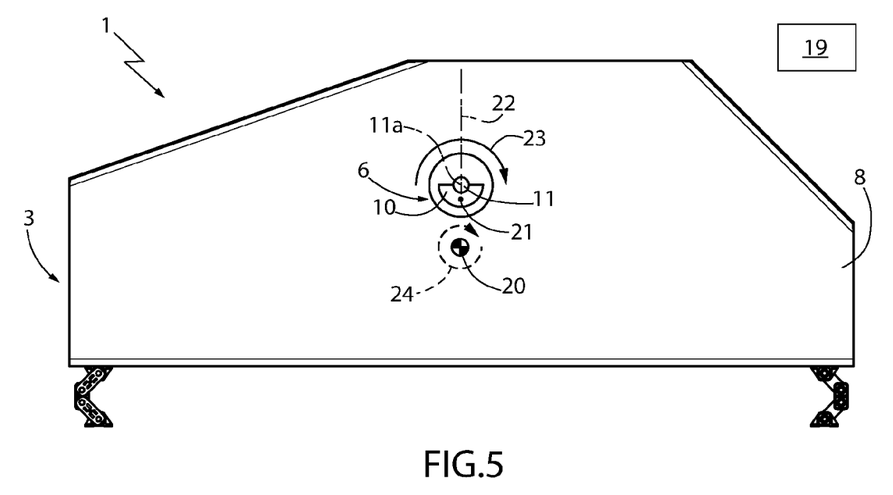
FIG. 5 shows a side view of the vibrating machine of FIG. 1, wherein the vibratory motion generated by the motor-vibrator is represented.

In FIG. 5, which shows a portion of the vibrating machine 1 according to a side view, namely according to a direction of observation that is parallel to the axes 11a of the motors 9, number 20 indicates an axis that is parallel to the axes 11a and goes through the centre of gravity of the body 3 subjected to the vibratory motion and number 21 indicates an axis that is parallel to the axes 11a and goes through the centre of gravity of the eccentric mass 10 of the motor-vibrator 6 shown in FIG. 5. In other words, in the view of FIG. 5 the centres of gravity of the body 3 and of the eccentric mass 10 correspond to the axes 20 and 21, respectively, and, therefore, hereinafter they are indicated with the same number. The angular position of the centre of gravity 21 relative to a polar coordinate system centred on the axis 11a is defined by a radial direction going through the axis 11a and the centre of gravity 21 and is indicated with 22 in FIG. 5.

The electronic control unit 19 is configured to control the electronic drive devices 14 of the two motor-vibrators 6 so as to cause the rotation of the shafts 11 according to respective angular velocity profiles along the turn angle and according to respective rotation directions, keeping the centres of gravity 21 of the eccentric masses 10 in phase with one another.

The phase of the centre of gravity 21 is defined by an initial angular position of the centre of gravity 21, namely the angular position in an initial instant of operation of the motor-vibrator 5. The centres of gravity 21 are considered in phase with one another when the deviation between the respective phases is zero.

In particular, the velocity profiles of the two motor-vibrators 6 are identical and consist of an angular velocity equal to a constant value VK along the entire turn angle and the two rotation directions coincide with the one indicated with 23 in FIG. 5. The phases of the two centres of gravity 21 are allowed to remain constant (zero phase displacement) thanks to the constant value VK of the rotation velocities and to the coinciding rotation directions.

The electronic control unit 19 is advantageously configured to initially position the shafts 11 of the motor vibrators 6 in such a way that the centres of gravity 21 are in phase with one another, before causing the rotation of the shafts 11 with the respective angular velocity profiles along the turn angle and with the respective rotation directions.

The configuration of the motor-vibrator assembly 5 of FIGS. 1-4 produces a circular vibratory motion, indicated with 24 in FIG. 5, namely a motion that can be represented as a circular rotation around a direction that is parallel to the axis of the centre of gravity 20.

According to a further embodiment of the invention shown in FIG. 6, the motor-vibrator assembly 5 differs from the one described with reference to FIGS. 1-4 in that it comprises two motor-vibrators 6 for each side wall 8, which are fixed to the latter in the way described above and are arranged with the respective axes 11*a* perpendicular to a direction 25. The two motor-vibrators 6 of a side wall 8 are coaxial to the corresponding two motor-vibrators 6 of the other side wall 8. Furthermore, the electronic control unit 19 is configured to control the electronic drive devices 14 of the two motor-vibrators 6 of each side wall 8 with the same angular velocity profile, which is equal to the constant value VK, and with opposite rotation directions. The centres of gravity 21 of the eccentric masses 10 are kept in phase with one another in the same way described above.

Figure 6:
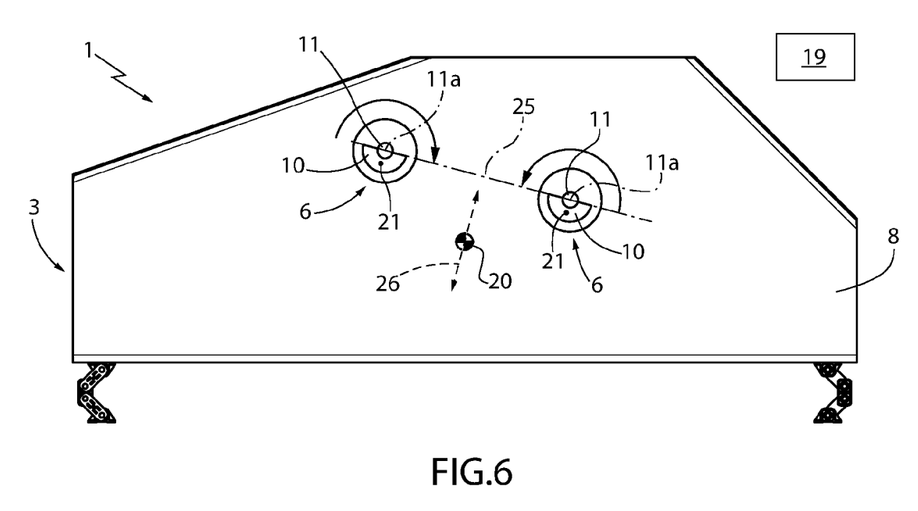
FIGS. 6 and 7 show, according to a same side view, respective embodiments of the vibrating machine of FIG. 1.

The configuration of the motor-vibrator assembly 5 of FIG. 6 produces a straight reciprocating vibratory motion along a direction 26 that is perpendicular to the axis of the centre of gravity 20 and to the direction 25.

According to a further embodiment of the invention shown in FIG. 7, the motor-vibrator assembly 5 differs from the one described with reference to FIG. 6 in that it comprises three motor-vibrators 6 for each side wall 8, which are arranged with the respective axes 11*a* at the vertexes of a triangle. Said triangle has two top vertexes, which lie in a given direction 27, and the third vertex faces downward relative to the direction 27. In other words, the two motor-vibrators 6 at the two top vertexes of the triangle have the respective axes 11*a* perpendicular to the direction 27.

Furthermore, the electronic control unit 19 is configured to control the electronic drive devices 14 of the three motor-vibrators 6 of each side wall 8 in such a way that the rotation direction 28 of the shaft 11 of the motor-vibrator 6 of a top vertex of the triangle is contrary to the rotation direction of the shafts 11 of the other two motor-vibrators 6 and in such a way that the centres of gravity 21 of the two motor-vibrators 6 of the two top vertexes of the triangle are maintained in phase with one another, while the centre of gravity 21 of the third motor-vibrator 6 is out of phase relative to the centres of gravity 21 of the other two motor-vibrators 6, according to an angular or phase deviation α. In the example of FIG. 7, the angular deviation α is equal to 90°.

The electronic control unit 19 is advantageously configured to initially position the shafts 11 of the motor-vibrators 6 in such a way that the centres of gravity 21 of the two motor-vibrators 6 at the two top vertexes of the triangle are in phase with one another and the centre of gravity 21 of the third motor-vibrator 6 is out of phase relative to the first two according to the angular deviation α, before causing the rotation of the shafts 11.

Figure 7:
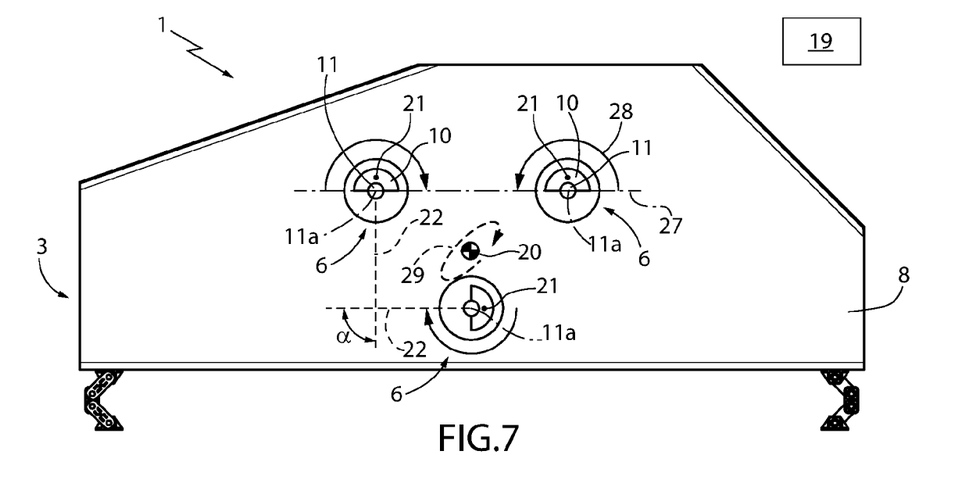

The configuration of the motor-vibrator assembly 5 of FIG. 7 produces a substantially elliptical vibratory motion, indicated with 29 in FIG. 7, namely a motion that can be represented as a rotation, around a direction that is parallel to the axis of the centre of gravity 20, which substantially has the shape of an ellipse having a main axis transverse to the direction 27.

Figure 8:
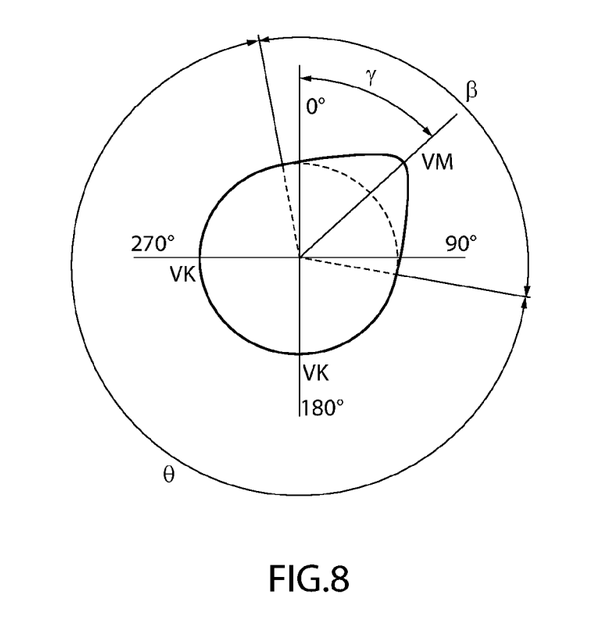
FIG. 8 shows a representation of the angular velocity profile of the shaft of the motor of one of the motor-vibrators of FIG. 3 according to a further embodiment.

According to a further embodiment that makes reference to FIGS. 1, 2, 3 and 8, namely an embodiment that entails a motor-vibrator 6 for each side wall 8, identical velocity profiles and rotation directions of the shafts 11 as well as identical centres of gravity 21 for the two motor-vibrators 6, the angular velocity profile of each shaft 11 comprises a portion of turn angle β (FIG. 8), in which the angular velocity, at first, increases from the constant value VK to a maximum value VM and, then, decreases from the maximum value VM to the constant value VK so as to modify the unbalance of the eccentric masses 10 at the portion of turn angle β. The portion of turn angle β is centred in a predetermined angular position γ with respect to a polar coordinate system integral to the body 3 of the vibrating machine. In a portion of turn angle β (FIG. 8) that is complementary to the portion of turn angle β, the angular velocity remains equal to the constant value VK. In the example of FIG. 8, which shows a representation of the velocity profile described above, the portion of turn angle β is 1100 and the angular position γ is 45°.

Figure 9:
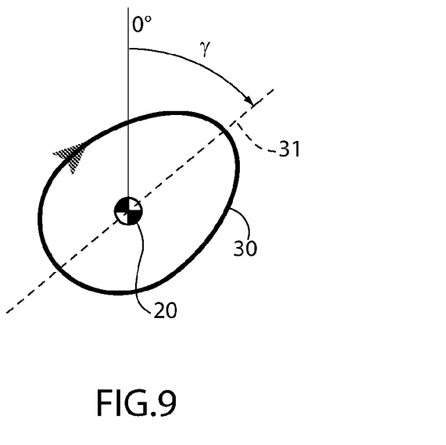
FIG. 9 shows a representation of the vibratory motion generated by the angular velocity profile of FIG. 8.

The configuration of the motor-vibrator assembly 5 of FIGS. 1, 2, 3 and 8 produces a complex vibratory motion, indicated with 30 in FIG. 9, which can be represented as a rotation, around a direction that is parallel to the axis of the centre of gravity 20, which substantially has the shape of a cam having a main axis 31 oriented according to the angular position γ.

The vibratory motion 30 can be configured by changing the maximum value VM of the angular velocity, the width of the portion of turn angle β and the angular position γ. In other words, the configuration of the motor-vibrator assembly 5 of FIGS. 1, 2, 3 and 8 defines an electronic cam.

Figure 10:
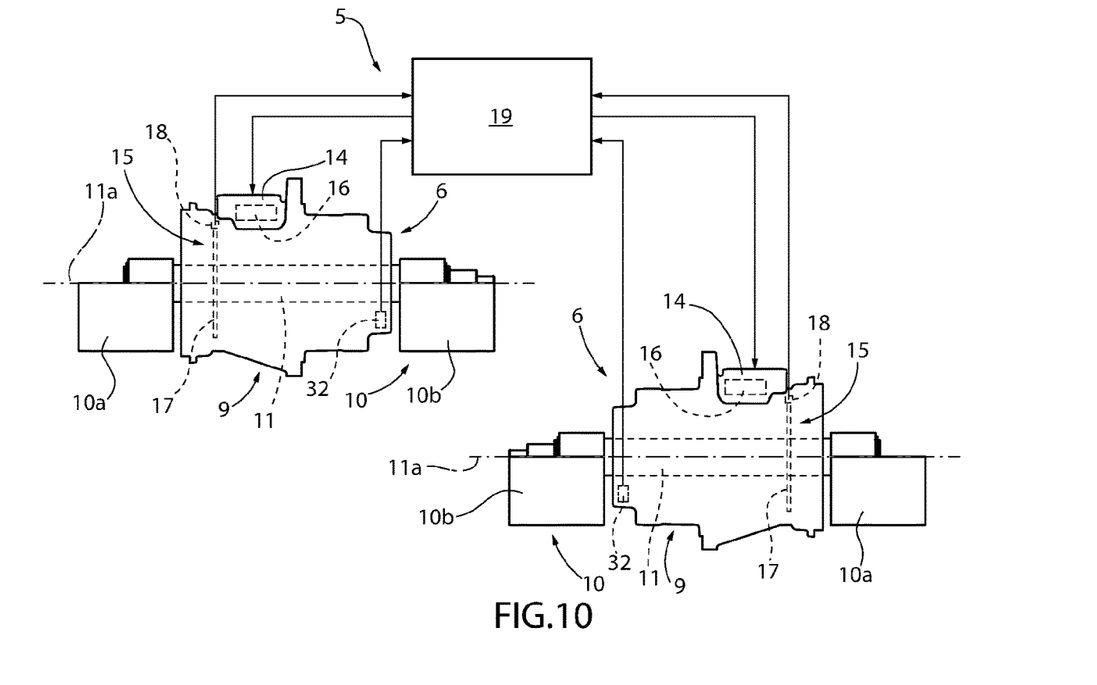
FIG. 10 shows a further embodiment of the motor-vibrator assembly of the vibrating machine of FIG. 1.

According to a further embodiment shown in FIG. 10, in which the corresponding elements are indicated with the same numbers as in FIG. 3, each motor-vibrator 6 comprises, on board, a respective accelerometer 32 to sense the vibrations to which the motor-vibrator 6 is subjected. In particular, the accelerometer 32 is fixed to the casing 12 of the motor 9. The accelerometer 32 is a three-axis accelerometer.

The electronic control unit 19 is configured to process the vibrations sensed by the accelerometer 32 so as to determine a vibrational state of the motor-vibrator assembly 5 and so as to control the electronic drive devices 14 of the motors 9 based not only on the angular positions sensed and on the angular velocities measured by means of the position sensors 15, but also on the vibrational state. In particular, the electronic control unit 19 is configured to modulate the angular velocity profiles of the shafts 11 and/or the angular deviation between the phases of the centres of gravity 21 of the respective eccentric masses 10 based on the aforesaid vibrational state. Modulation of the angular velocity profile means a modulation of the angular velocity value.

According to further embodiments of the invention which are not shown herein, the vibrating machine 1 comprises a plurality of motor-vibrator assemblies 5 of the type described above with reference to FIG. 10, which are arranged, for example, in the way shown in FIGS. 6 and 7.

Figure 11:
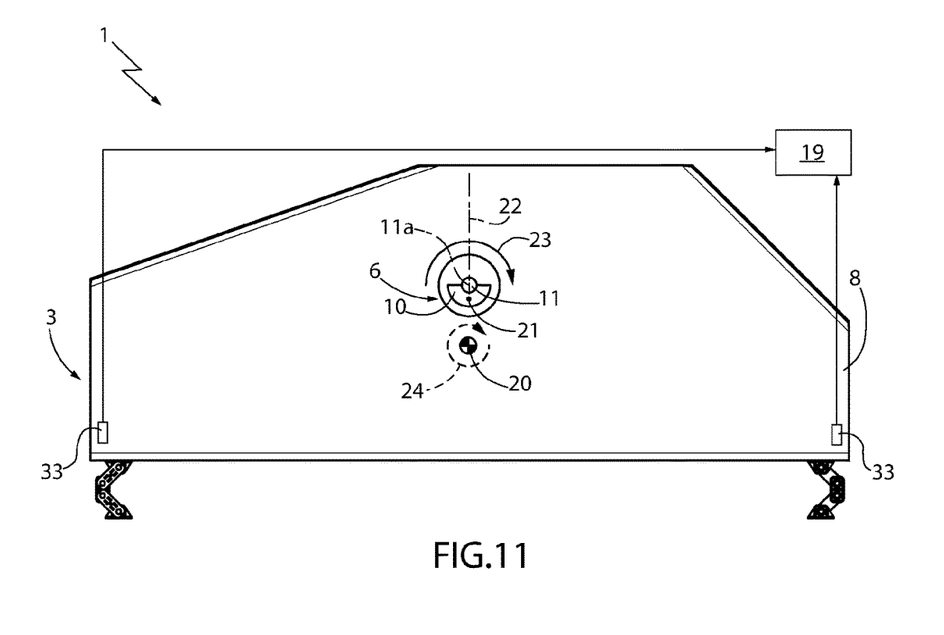
FIGS. 11 and 12 show, according to a same side view, respective embodiments of the vibrating machine of FIG. 1.

According to a further embodiment shown in FIG. 11, in which the corresponding elements are indicated with the same numbers as in FIG. 5, the motor-vibrator assembly 5 comprises the accelerometers 32 (FIG. 3) and the vibrating machine 1 comprises one or more accelerometers 33 fixed in suitable points of the body 3, for example at two longitudinal ends of each one of the side walls 8 of the body 3, in order to sense the vibrations to which the body 3 is subjected. The electronic control unit 19 is configured to process the vibrations sensed by the accelerometers 32 in combination with the vibrations processed by the accelerometers 33 so as to determine the vibrational state of the motor-vibrator assembly 5 and so as to control the electronic drive devices 14 based on the angular positions sensed and on the angular velocities measured by means of the position sensors 15 as well as on the vibrational state.

The body 3 of the vibrating machine 1 is designed to contain material to be treated by means of the predetermined vibratory motion. In the particular example shown in the figures and, in particular, in FIGS. 1 and 2, the vibrating machine 1 is a vibrating feeder, which sieves the material placed on the grille 7. The vibrating machine 1 receives the material from an upstream processing process and, in particular, from a further machine, which is not shown in the figures and has a container or a loading plane.

Figure 12:
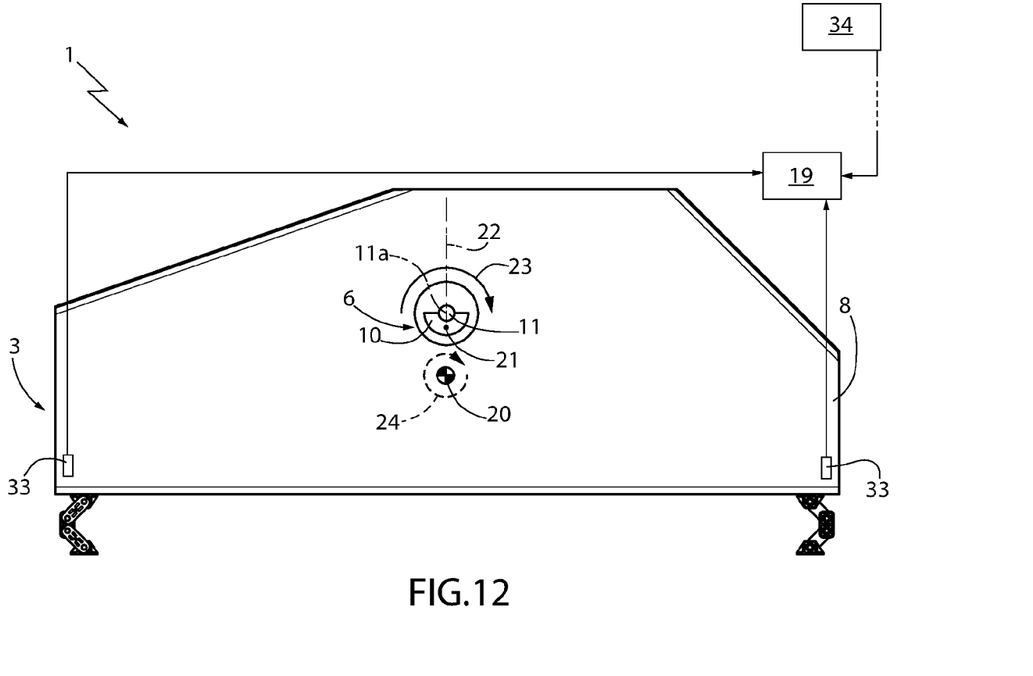

According to a further embodiment shown in FIG. 12, in which the corresponding elements are indicated with the same numbers as in FIG. 11, the further machine, which supplies the material to the vibrating machine 1, is provided with one or more load cells 34 arranged under the container or loading plane in order to sense the load of material in the further machine and, in particular, measure the weight of the material present in the container or loading plane, namely before the material is transferred onto the vibrating machine 1. The electronic control unit 19 is configured to control the electronic drive devices 14 based on the sensed load.

The embodiments described above with reference to FIGS. 10-12 provide a method to control the vibrating machine 1, which automatically adjusts to the current and future load of the vibrating machine 1.

In particular, in the embodiments described above with reference to FIGS. 10 and 11, the motor-vibrator assembly 5 automatically adjusts to the load of the vibrating machine 1, namely to the actual quantity of material contained in the body 3, in order to quickly reach the predetermined vibratory motion. Indeed, the angular velocity profiles and the angular deviations between the phases of the centres of gravity 21 of the eccentric masses 10 are predetermined as a function of a supposed load of the vibrating machine 1. If the load of the vibrating machine 1 changes relative to the supposed load, the vibrational motion generated by the motor-vibrator assembly 5 could not be the desired one.

The embodiment of FIG. 11 permits a more precise adjustment, as the vibrational state is determined based on a larger number of items of information, namely not only the vibrations sensed on the motors 9 of the motor-vibrators 6, but also the vibrations directly sensed on the body 3 of the vibrating machine 1.

The embodiment of FIG. 12 enables a predictive adjustment, thanks to the information provided by the load cells 34 used by a processing process upstream of the vibrating machine 1.

The main advantage of the motor-vibrator assembly 5 disclosed above lies in the quick set-up, since, unlike known motor-vibrators, it does not require mechanical joints to synchronize the eccentric masses, thanks to the use of synchronous motors provided with position sensors and controlled by an electronic control unit. Furthermore, the use of synchronous brushless motors and the absence of mechanical joints reduce the mechanical parts subjected to friction, and hence wear, to the sole bearings of the motors.

Another advantage lies in the possibility of controlling the velocity profile of the synchronous motor in a precise manner along the turn angle leads to the chance of generating complex vibratory motions even using one single motor-vibrator 6. The use of the accelerometers 32 and 33 mounted on board the motor-vibrators 6 and the body 3 of the vibrating machine 1 allows the behaviour of the motor-vibrator assembly 5 to be modulated as a function of the load of the vibrating machine 1, in order to quickly reach the predetermined vibratory motion.

A further advantage lies in the eccentric mass 10 divided into the two bodies 10a and 10b fixed at the free ends of the shaft 11 of the motor 9. This configuration permits a balance that is such as to reduce the wear of the bearings of the motor 9 and, at the same time, allows the single motor-vibrator 6 to be mounted on any part of any vibrating machine. For example, in case the vibrating machine is a vibrating table, the casing 12 of the motor 9 of the single motor-vibrator 6 comprises, instead of the flange 13, a plurality of feet, which can be fixed to a horizontal part of the vibrating table.

The invention claimed is:

1. Motor-vibrator assembly for a vibrating machine, the motor-vibrator assembly comprising a plurality of motor-vibrators, each of which comprises an electric motor consisting of a synchronous motor and at least one eccentric mass connected on the drive shaft of the synchronous motor, position sensing means to sense the angular position and measure the angular velocity of the drive shafts, electronic drive means to drive the synchronous motors, and electronic control means, which are configured to control said electronic drive means based on the angular positions sensed and on the angular velocities measured so that the motor-vibrator assembly generates a predetermined vibratory motion; wherein the eccentric mass is fixed to the drive shaft of the relative synchronous motor and is divided into two bodies which are fixed to two respective free ends of the drive shaft, the two free ends of the drive shaft projecting from a casing of the synchronous motor in the area of two respective opposite longitudinal ends of the synchronous motor;
wherein said electronic control means are configured to control said electronic drive means in order to bring the drive shafts in rotation according to respective angular velocity profiles along a turn angle and respective directions of rotation, by keeping the centres of gravity of the eccentric masses in phase with each other or out of phase with each other according to predetermined angular deviations, in order to obtain said predetermined vibratory motion.

2. Motor-vibrator assembly according to claim 1, wherein said electronic control means are configured to control said electronic drive means so as to position the drive shafts in such a way that said centres of gravity are arranged in phase with each other or out of phase with each other according to said angular deviations ($\alpha$), before moving the drive shafts with said angular velocity profiles along the turn angle and said directions of rotation.

3. Motor-vibrator assembly according to claim 1, wherein each of said angular velocity profiles comprises at least a first portion of turn angle in which the angular velocity is equal to a first velocity value.

4. Motor-vibrator assembly according to claim 3, wherein each of said angular velocity profiles comprises at least a second portion of turn angle in which the angular velocity first increases from said first velocity value to a maximum velocity value and then decreases from the maximum velocity value to the first velocity value in such a way as to modify the centrifugal force of the relative eccentric mass in the second portion of turn angle.

5. Motor-vibrator assembly according to claim 4, wherein said first portion of turn angle is complementary to said second portion of turn angle.

6. Motor-vibrator assembly according to claim 1, wherein said electronic drive means comprise a plurality of electronic drive devices, each of which is designed to drive a respective synchronous motor.

7. Motor-vibrator assembly according to claim 6, wherein each of said electronic drive devices is mounted on board the respective synchronous motor.

8. Motor-vibrator assembly according to claim 6, wherein each of said electronic drive devices comprises an inverter.

9. Motor-vibrator assembly according to claim 1, wherein said position sensing means comprise, for each synchronous motor, a respective encoder mounted on board the synchronous motor; the encoder comprising a phonic wheel integral to the drive shaft and a sensor element fixed to the casing of the synchronous motor in order to read the angular movements of the phonic wheel.

10. Motor-vibrator assembly according to claim 1, wherein said position sensing means comprise, for each synchronous motor, respective electromagnetic flux observatory means to determine a reciprocal angular position between rotor and stator of the synchronous motor.

11. Motor-vibrator assembly according to claim 1, wherein each motor-vibrator comprises respective first acceleration sensing means fixed to the casing of the synchronous motor to detect first vibrations, and said electronic control means are configured to process the first vibration sensed so as to determine a vibrational state of the motor-vibrator assembly and control said electronic drive means based on said vibrational state.

12. Vibrating machine comprising a body, elastic means to mount the body on a base and the motor-vibrator assembly, which comprises a plurality of motor-vibrators fixed to the body to generate and transmit, to the body, a predetermined vibratory motion, the vibrating machine being characterized in that the motor-vibrator assembly is according to claim 11, and comprises second acceleration sensing means fixed to said body to sense second vibrations; said electronic control means-being configured to process the first vibration sensed in combination with the second vibrations sensed in order to determine said vibrational state of the motor-vibrator assembly.

13. Motor-vibrator assembly according to claim 1, wherein each motor-vibrator comprises respective first acceleration sensing means fixed to the casing of the synchronous motor to sense first vibrations, and said electronic control means are configured to process the first vibration sensed so as to determine a vibrational state of the motor-vibrator assembly and modulate said angular velocity profiles and/or said angular deviations based on said vibrational state.

14. Vibrating machine comprising a body, elastic means to mount the body on a base and the motor-vibrator assembly, which comprises a plurality of motor-vibrators fixed to the body to generate and transmit, to the body, a predetermined vibratory motion, the vibrating machine being characterized in that the motor-vibrator assembly is according to claim 1.

15. Method to control a vibrating machine comprising a body, elastic means to mount the body on a base and a motor-vibrator assembly comprising: a plurality of motor-vibrators, each of which is fixed to the body and comprises a synchronous motor and at least one eccentric mass fixed on the drive shaft of the synchronous motor, the eccentric mass being divided into two bodies fixed to two free ends of the drive shaft, the two free ends of the drive shaft projecting from a casing of the synchronous motor in the area of two respective opposite longitudinal ends of the synchronous motor; position sensing means to sense the angular position and measure the angular velocity of the drive shafts; and electronic drive means to drive the synchronous motors; the method comprising:
sensing first vibrations by means of first acceleration sensing means fixed to a casing of the synchronous motor;
processing the first vibrations sensed so as to determine a vibrational state of the motor-vibrator assembly; and
controlling the electronic drive means based on the angular positions sensed, on the angular velocities measured and on the vibrational state, so that the motor-vibrator assembly generates a predetermined vibratory motion;
wherein said body is designed to contain material to be treated by means of said vibratory motion and the vibrating machine receives the material from a further machine; the method comprising:
sensing the load of material in the further machine by means of load sensing means, before the material is transferred onto the vibrating machine;
said electronic drive means being controlled based on the load sensed.

16. Method according to claim 15 and further comprising:
sensing second vibrations by means of second acceleration sensing means fixed to the body;
said first vibrations sensed being processed in combination with the second vibrations sensed so as to determine the vibrational state of the motor-vibrator assembly.

\* \* \* \* \*